United States Patent [19]
Olsen

[11] Patent Number: 5,011,253
[45] Date of Patent: Apr. 30, 1991

[54] OPTICAL SYSTEM FOR LASER MARKING

[76] Inventor: Flemming Olsen, 30, Nordskovvej, Stenlille DK-4295, Denmark

[21] Appl. No.: 474,136
[22] PCT Filed: Dec. 2, 1988
[86] PCT No.: PCT/DK88/00201
§ 371 Date: May 7, 1990
§ 102(e) Date: May 7, 1990
[87] PCT Pub. No.: WO89/05208
PCT Pub. Date: Jun. 15, 1989

[30] Foreign Application Priority Data
Dec. 8, 1987 [DK] Denmark .............................. 6447/87

[51] Int. Cl.$^5$ .............................................. G02B 6/32
[52] U.S. Cl. ................................. 350/96.18; 350/96.1
[58] Field of Search ........... 219/121.6, 121.74, 121.75; 372/103; 350/96.18, 96.1

[56] References Cited
U.S. PATENT DOCUMENTS
4,009,364 2/1977 Ladstädter ........................ 219/121.6
4,480,168 10/1984 Cielo et al. ...................... 219/121.75

Primary Examiner—John D. Lee
Assistant Examiner—John Ngo
Attorney, Agent, or Firm—Scully, Scott, Murphy & Presser

[57] ABSTRACT

An optical system for laser marking, such as for engraving marks such as numbers and dates on surfaces, and exhibiting improved efficiency and improved quality of the resulting mark. The optical system includes a focusing system, such as a lens, and a concave mirror situated between the laser and the mask with its vertex at the focal point of the focusing system and its reflecting surface facing the mask. An inlet opening in the concave mirror is formed about the vertex, and the transverse measurement of the inlet opening is slightly larger than the transverse measurement of the focal point. The mask is formed as a mirror, preferably a plane mirror, with the reflecting surface facing the concave mirror, and the radius of curvature of the concave mirror is longer than twice the distance between the mask and the concave mirror. In operation, the portion of the laser beam radiated through the mask is increased because the portion thereof not passing directly through the mask openings is reflected by the mirror face of the mask back to the concave mirror, which in turn reflects the light back to the mask, such that additional portions of the laser beam pass through the mask openings. The size of the reflecting surface of the concave mirror and consequently the amount of the light reflected by the concave mirror are optimized by the laser beam being focused by the focusing system in the small opening in the vertex of the mirror.

11 Claims, 1 Drawing Sheet

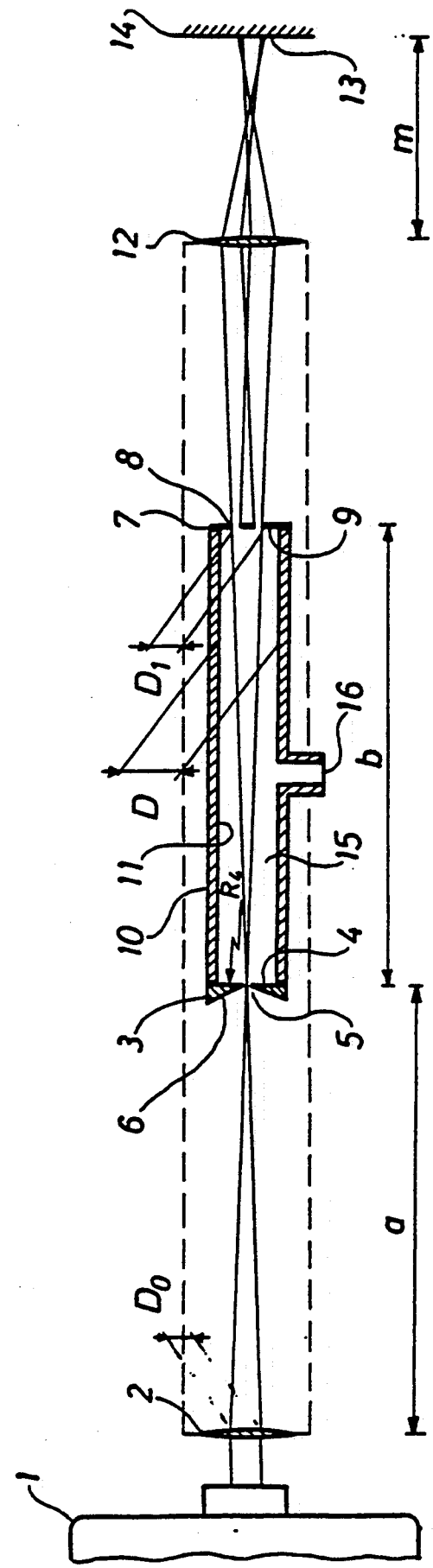

OPTICAL SYSTEM FOR LASER MARKING

TECHNICAL FIELD

The invention relates to an optical system for laser marking and comprising—when seen in the direction of a light beam of a predetermined transverse measurement and emitted by a laser—a mask including a mask pattern, and an image-producing means, such as a lens, and whereby the transverse measurement of the laser beam on the mask is slightly larger than the transverse measurement of the mask pattern.

Beyond current marking the laser marking also includes all processings where a thin surface layer is removed or evaporated from an article by a laser beam passing through a mask.

BACKGROUND ART

It is generally known to use short, high-energy laser pulses for engraving marks, such as numbers or dates, on various surfaces, such as coloured paper or eloxated aluminium, by directing the laser beam towards a mask made of for instance copper or stainless steel and in which the desired pattern is removed. In this manner a minor portion, typically less than 10%, of the laser light passes through the openings of the mask and through an image-producing optical system usually including a lens, and is imaged on the surface of the article.

However, far the major portion of the laser light is reflected by the portions of the mask not being removed, and thus the process utilizes the efficiency of the laser only to a minor degree. The radiation reflected by the mask is furthermore damaging to the laser in case it is directed towards said laser, because reflected radiation can interfere with the operation of the laser or, in extreme cases, damage parts thereof. Therefore the mask is often made diffusely reflecting or absorbing on its surface facing the beam.

With respect to laser processing of highly reflecting materials U.S. Pat. No. 4,480,168 discloses the use of a mirror system for catching the reflections from the surface of an article situated immediately below the mirror system, and for redirecting said reflections to the surface of the article in order thereby to increase the coupling of light into the material. Thus the publication discloses a mirror system comprising a concave upper mirror with a small opening allowing passage of a focused laser beam, and a lower mirror with a reflecting surface facing the upper mirror and with a larger opening allowing the laser beam to leave the mirror system and radiate the surface of the article so as to be reflected therefrom back to the mirror system. The surface of the article forms thus an essential part of the mirror system for achieving an increased coupling of light into said surface. In other words the refections from the surface are redirected thereto by means of the upper mirror.

If the above system is to be used for laser-marking an article, the latter must according to the publication be situated very close to the lower mirror with the rather unfortunate sideeffect that the material removed by the marking squirts onto the edge of the larger opening and is deposited thereon. As a consequence thereof the opening geometry or dimension changes gradually.

DESCRIPTION OF THE INVENTION

The object of the invention is to provide an optical system for laser-marking and exhibiting a substantially improved efficiency compared to the known optical systems for laser-marking, and which improves the quality of the resulting mark.

The optical system according to the invention is characterised in that a focusing means, such as a lens, and a concave mirror are situated between the laser and the mask, the focusing means being situated to focus the laser beam emitted by the laser to have said transverse measurement on the mask after focusing, the concave mirror being situated with its vertex in the focal point of the focusing means and with the reflecting surface facing the mask, and where an inlet opening is shaped about the vertex, the transverse measurement of said inlet opening being slightly larger than the transverse measurement of the focal point, that the mask is shaped as a mirror, preferably a plane mirror, with the reflecting surface facing the concave mirror, and that the radius of the curvature of the concave mirror is longer than twice the distance between the mask and the concave mirror.

In this manner the amount of energy radiated through the mask is increased because the portion of the laser beam not passing directly through the mask openings is reflected by the reflecting surface or mirror face of the mask. The light is reflected back to the concave mirror in turn reflecting the light to the mask, whereby an additional portion of the laser beam passes through the mask openings. The size of the reflecting surface of the concave mirror and consequently the amount of the light reflected by the concave mirror are optimized by the laser beam being focused by means of a focusing means in the small opening in the vertex of the mirror. In addition the small inlet opening of the concave mirror protects the laser against possible damaging reflections from the mask towards said laser. Furthermore the mask pattern of the mask is uniformly radiated, and consequently the energy is uniformly distributed in the light emitted. The latter is particularly due to the fact that the indicated relationship between the radius of the curvature of the concave mirror and the distance between said concave mirror and the mask ensures that the radiation reflected by the mask and subsequently by the concave mirror exposes the entire mask pattern the first time it radiates the mask, and where it includes the highest content of energy.

According to the invention the radius of the curvature of the concave mirror may be substantially in the range of 3 to 10 times the distance between the concave mirror and the mask. Tests have shown that a suitable compromise between uniform distribution of energy and high efficiency can be achieved.

Moreover according to the invention an elongated, straight, cylindrical waveguide with a reflecting inner surface may extend coaxially and substantially between the concave mirror and the mask. As a result the distribution of energy on the mask and thereby also of the laser beams passing through the mask openings is uniform because the waveguide tries to concentrate the radiation farthest from the optical axis, whereas the concave mirror constituting a stable resonator together with the mask tries to concentrate the radiation adjacent the optical axis. In this manner a very uniform distribution of energy is obtained across the mask.

Furthermore according to the invention the transverse measurements of the cylindrical waveguide may correspond to 1 to 5, preferably 1.5 to 2.5 times the transverse measurement of the incoming light beam on the mask. In this manner the maximum efficiency of the waveguide is obtained depending on the focal length of the concave mirror.

Moreover according to the invention the inlet opening of the concave mirror and the waveguide may be of a transverse measurement congruent with the laser beam, preferably a rectangular transverse measurement, and especially a square transverse measurement. In this manner there is provided a compensation for the irregularities in the distribution of the laser beam leaving the laser, said irregularities appearing as lines in the laser beam depending on the transverse geometry of the laser beam and the way the laser beam is generated. As a result a perfect mark is obtained on the article.

Moreover the distance between the concave mirror and the mask may according to the invention correspond substantially to the focal length of the focusing means. Such an embodiment provides in practice excellent results both as far as the efficiency and as far as the marking quality are concerned.

In addition according to the invention the focusing means may be of a focal length of between 150 and 500 mm, preferably between 250 and 375 mm, said relatively long focal length reducing the risk of plasma formation both in the inlet opening of the concave mirror and in the openings of the mask.

On the side facing the focusing means the concave mirror may comprise a frusto-conical surface with the vertex adjacent the inlet opening. In this manner the portions of the laser beam, which might incident on the edge of the inlet opening, are prevented from being reflected back to the laser and thereby from subjecting said laser to possible damaging effects.

Together the concave mirror, the cylindrical waveguide, and the mask may furthermore according to the invention form a pressure chamber which can be supplied with protecting gas, whereby an undesired oxidation of the reflecting surfaces is prevented, and the gas prevents plasma formation in the inlet opening and the mask openings.

Moreover according to the invention the focusing means and the image-producing means may form end walls of a pressure chamber which can be supplied with protecting gas. In this manner the risk of plasma formation immediately before the inlet opening and after the mask openings is eliminated at the same time as the consumption of protecting gas is minimized.

Finally according to the invention the reflecting surface of the concave mirror may be formed by a plurality of small, plane mirror segments, which provides a very uniform distribution of energy on the mask and therefore a very uniform mark on the article.

BRIEF DESCRIPTION OF THE DRAWING

The invention is described in greater detail below with reference to the accompanying drawing, in which the only Figure is a diagrammatic view of an embodiment of the optical system according to the invention.

DESCRIPTION OF THE PREFERRED EMBODIMENTS OF THE INVENTION

The optical system according to the invention for laser marking comprises—when seen in the direction of a laser beam from a laser 1—a focusing lens 2 situated coaxially to the laser beam of a preferably rectangular, and especially square transverse measurement. The lens 2 is preferably of a relatively long focal length a. A concave mirror 3 is situated with the vertex in the focal point of the lens, and the reflecting surface or mirror face 4 of said concave mirror faces away from the direction of the laser beam and is of a relatively large radius of curvature $R_4$. An inlet opening 5 is shaped about the vertex of the concave mirror 3 and is congruent with the transverse measurement of the laser beam. The inlet opening 5 allows passage of the focusing laser beam and is of a transverse measurement slightly larger than the transverse measurement of the focal point. The side of the concave mirror 3 facing the focusing lens 2 comprises a frusto-conical surface 6 with its vertex adjacent the inlet opening. The frusto-conical surface prevents the portions of the laser beam, which might incident on the edge of the inlet opening, from being reflected back into the laser and thereby from damaging said laser.

Having passed the mirror 3 the laser beam is met by a mask 7 with a reflecting surface or mirror face 9 facing the concave mirror. The mask 7 may optionally comprise several mask portions or sections arranged behind one another and/or side by side. The distance b between the concave mirror 3 and the mask 7 corresponds in this embodiment substantially to the focal length a of the focusing lens 2, whereby the transverse measurement $D_1$ of the laser beam on the mask corresponds substantially to the transverse measurement of the beam leaving the laser 1. A mask pattern or mask openings 8 are shaped in the mask 7, and the transverse measurement of this mask pattern is slightly smaller than the transverse measurement $D_1$ of the laser beam on the mask.

An elongated, straight, cylindrical waveguide 10 is coaxially situated between the concave mirror 3 and the mask 7. The waveguide is reflecting on its inner surface 11 and is of a transverse measurement being congruent with the transverse measurement of the laser beam. In the illustrated embodiment the inner transverse measurement D of the waveguide 10 corresponds substantially to twice the transverse measurement $D_1$ of the laser beam on the mask 7.

A portion of the laser beam being met by the mask 7 passes directly through the mask pattern or the mask openings 8, whereas the remaining portion of the laser beam is reflected by the surface 9 of the mask 7 and thereby directed back towards the reflecting surface 4 of the mirror 3. In turn the reflecting surface 4 directs the light towards the mask 7, whereafter an additional portion of the laser beam passes through the mask pattern 8. At the same time the reflecting inner surface 11 of the waveguide 10 reflects the radiation reflected towards it by the reflecting surface 9 of the mask 7 or the reflecting surface 4.

While the reflecting surfaces 4 and 9 in general try to concentrate the radiation closely about the optical axis, the waveguide 10 of a square transverse measurement tries in general to uniform the radiation or to concentrate said radiation farther away from the optical axis and thereby tries to provide a uniform distribution of energy across the mask 7. The latter implies furthermore that the laser radiation passing through the mask pattern 8 discloses a very uniform distribution of energy when being met by an image-producing lens 12. The image-producing lens 12 is situated coaxially to the optical axis after the mask 7 and produces an image 13 of the mask pattern 8 on the surface of the article 14 to be marked. As a strong short laser pulse is employed, typically involving a pulse energy of about 0.5–20 joule and a pulse length of typically 10–1000 ns, the laser radiation evaporates a thin surface layer on the article and leaves an image of the mask on the article.

Together the concave mirror 3, the cylindrical waveguide 10, and the mask 7 form a pressure chamber 15 which can be supplied with a protecting gas through an inlet opening 16. The protecting gas may leave the chamber 15 through both the inlet opening 5 of the concave mirror 3 and through the mask pattern 8 of the mask 7. The protecting gas prevents an undesired oxidation of the reflecting surfaces 4, 9, 11 and prevents plasma formation in the inlet opening 5 and the mask openings 8, as said plasma might otherwise shade these openings. Gases of a high ionic potential can be used as protecting gas.

The entire optical system is situated in such a manner in a housing not shown that the components of the optical system can be very accurately adjusted, which ensures an optimum efficiency of the system and an optimum distribution of energy of the beam leaving the system. These adjustment possibilities include:

the concave mirror 3 which can be tilted about its centre in two planes in order to optimize the resonator represented by the concave mirror 3 and the mask 7, the mask 7 which is also tiltable about its centre in two planes in order to optimize the above resonator, the lens 2 which can be moved in three axial directions in order to ensure a focusing of the laser beam in the inlet opening 5, the waveguide 10 which can be situated coaxial to the mirror 3 and the mask 7, the part of the optical system comprising the mirror 3, the waveguide 10, and the mask 7, and which can be tilted about the centre of the inlet opening 5 in two planes in order to ensure that the laser beam enters said part of the system at the correct angle, the image-producing lens 12 which can be correctly positioned in three axial directions relative to the mask 7 in such a manner that the maximum portion of the light leaving through the mask pattern 8 is received and image-produced in the correct dimensions, the distance m between the entire optical system and the article 14 in order to achieve a sharp image on the surface of the article.

The majority of these adjustments are, of course, performed by the manufacturer of the optical system so that the user thereof need only perform the absolutely necessary adjustments.

Tests have shown that the optical system according to the invention provides an increase in the energy of about 100% at the same time as the sharpness of the mark produced on the article is improved by the use of a laser beam of a transverse measurement of $D_0=20$ times 20 mm and an optical system of the following dimensions $a=b=330$ mm, $R_4=2000$ mm, and $D=36$ times 36 mm.

The image-producing lens 12 may be replaced by more lenses arranged in succession in case the latter is considered advantageous. Furthermore the reflecting surface of the concave mirror 3 may instead of being a continuous surface also comprise a plurality of small mirrors together forming the reflecting surface. Furthermore lasers may be used which emit laser beams of other transverse measurements than the rectangular, such as circular, and the inlet opening and the waveguide may be of other transverse measurements neither congruent thereto nor mutually congruent. Furthermore, the waveguide can be completely omitted.

I claim:

1. An optical system for laser marking and comprising when seen in the direction of a light beam of a predetermined transverse measurement ($D_0$) and emitted by a laser (1)—a mask (7) including a mask pattern (8), and an image-producing means (12), such as a lens, and whereby the transverse measurement ($D_1$) of the laser beam on the mask (7) is larger than the transverse measurement of the mask pattern (8), characterised in that a focusing means (2), such as a lens, and a concave mirror (3) are situated between the laser (1) and the mask (7), the focusing means (2) being situated to focus the laser beam emitted by the laser (1) to have said transverse measurement ($D_1$) on the mask (7) after focusing, the concave mirror (3) being situated with its vertex in the focal point of the focusing means (2) and with the reflecting surface (4) facing the mask (7), and where an inlet opening (5) is shaped about the vertex, the transverse measurement of said inlet opening being slightly larger than the transverse measurement of the focal point, that the mask (7) is shaped as a mirror, preferably a plane mirror, with the reflecting surface (9) facing the concave mirror (3), and that the radius of the curvature ($R_4$) of the concave mirror (3) is longer than twice the distance (b) between the mask (7) and the concave mirror (3).

2. An optical system as claimed in claim 1, characterised in that the radius ($R_4$) of the curvature of the concave mirror (3) is substantially in the range of 3 to 10 times the distance (b) between the concave mirror (3) and the mask (7).

3. An optical system as claimed in claim 1 or 2, characterised in that an elongated, straight, cylindrical waveguide (10) with a reflecting inner surface (11) extends coaxially and substantially between the concave mirror (3) and the mask (7).

4. An optical system as claimed in claim 3, characterised in that the transverse measurement of the cylindrical waveguide (10) corresponds to 1 to 5, preferably 1.5 to 2.5 times the transverse measurement ($D_1$) of the incoming light beam on the mask (7).

5. An optical system as claimed in claim 3, characterised in that the inlet opening (5) in the concave mirror (3) and the waveguide (10) is of a transverse measurement congruent with the laser beam, said transverse measurement preferably being rectangular and especially being square.

6. An optical system as claimed in claim 1 or 2, characterised in that the distance (b) between the concave mirror (3) and the mask (7) corresponds substantially to the focal length (a) of the focusing means (2).

7. An optical system as claimed in claim 1 or 2, characterised in that the focusing means (2) is of a focal length in the range of 150 to 500 mm, preferably 250 to 375 mm.

8. An optical system as claimed in claim 1 or 2, characterised in that on the side facing the focusing means (2) the concave mirror (3) comprises a frusto-conical surface (6) with a vertex adjacent the inlet opening (5).

9. An optical system as claimed in claim 3, characterised in that the concave mirror (3), the cylindrical waveguide (10), and the mask (7) together form a pressure chamber (15), which can be supplied with protecting gas.

10. An optical system as claimed in claim 1 or 2, characterised in that the focusing means (2) and the image-producing means (12) form end walls of a pressure chamber which can be supplied with protecting gas.

11. An optical system as claimed in claim 1 or 2, characterised in that the reflecting surface (4) of the concave mirror (3) is formed by a plurality of small plane mirror segments.

* * * * *